Oct. 16, 1962 C. E. MILLER 3,058,752
GASKET
Filed June 30, 1959

*INVENTOR.*
BY CHALMER E. MILLER
Albert L. Jeffers
Attorney

– – –

United States Patent Office 3,058,752
Patented Oct. 16, 1962

3,058,752
GASKET
Chalmer Edward Miller, Fort Wayne, Ind., assignor to National Coupling Company, Inc., Fort Wayne, Ind.
Filed June 30, 1959, Ser. No. 824,000
7 Claims. (Cl. 277—171)

This invention relates to a plastic gasket with a rubber member sealed therein particularly for use with pipe made of concrete, steel, iron or of ceramic material used for sewer lines.

Numerous gaskets for bell and spigot and tongue and groove pipe have been proposed in the past, many of which involve the use of rubber material which is subject to deterioration by ozone, chemicals or oils present in the sewer. It is, also, known in the art that rubber will absorb a certain amount of water over a period of time which will reduce the life of the gasket wherein it is effective as a seal. In some cases, a consulting engineer will specify the use of a petroleum sealing agent which may be detrimental to rubber, thus shortening the sealing life of such a gasket.

It is one of the objects of the present invention to provide a pipe joint sealing gasket in which a resilient rubber O-ring is surrounded by a plastic member to produce a gasket having the same features or advantages as the all-rubber gasket and to protect the rubber O-ring against any outside deteriorating agents.

It is a further object of this invention to provide a gasket having a flexible member disposed in a plastic tubular element with a non-harmful lubricant surrounding the flexible member so that it will assume proper circumferential alignment when placed on a spigot.

Another object of the invention is to provide a pipe joint sealing gasket which is resistant to ozone, chemicals, petroleum and its by-products.

Still another object of the invention is to provide a pipe joint sealing gasket which does not require any special compound or sealing agent to be used in conjunction with sealing the gasket.

A salient object of this invention is a novel method of making a combination rubber and plastic gasket wherein the rubber ring is cut to substantially the exact length of the circumference and a resilient plastic sheath of a smaller length is disposed around the rubber ring and elongated or stretched prior to splicing so that the rubber ring will be positioned positively without development of tensile stresses in the rubber.

A further object of this invention is to provide a gasket that could be placed on a pipe spigot or tongue at the manufacturing plant which would not deaden and would prevent durometer increase of the rubber if exposed to the sun.

Other objects and features of the invention will become apparent from the following description which proceeds with reference to the accompanying drawings wherein.

Figure 1:
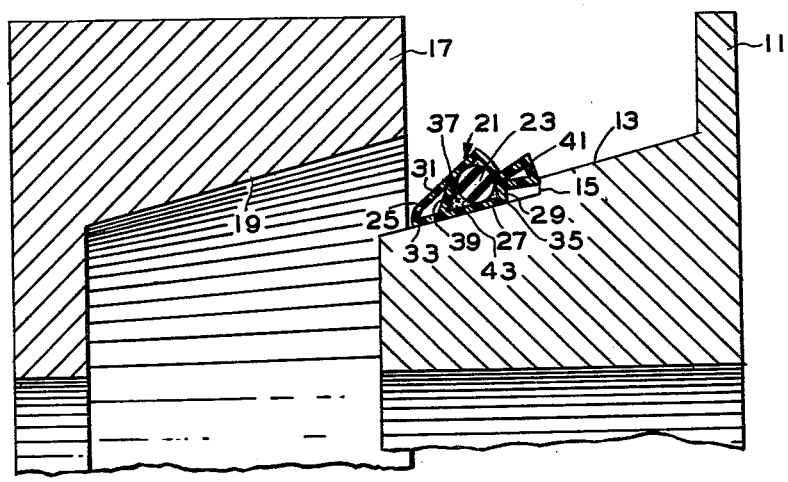
FIGURE 1 is a detail sectional view showing the bell and spigot of two pipes and a section of the gasket forming the subject matter of the present invention.

Referring to FIGURE 1, the reference numeral 11 designates a conventional pipe having a spigot 13 with its peripheral surface converging inwardly and provided with a vertical step portion 15. The other end of the pipe is formed with a bell 17 which has a tapered portion 19 for cooperation with the spigot surface 13.

Figure 2:
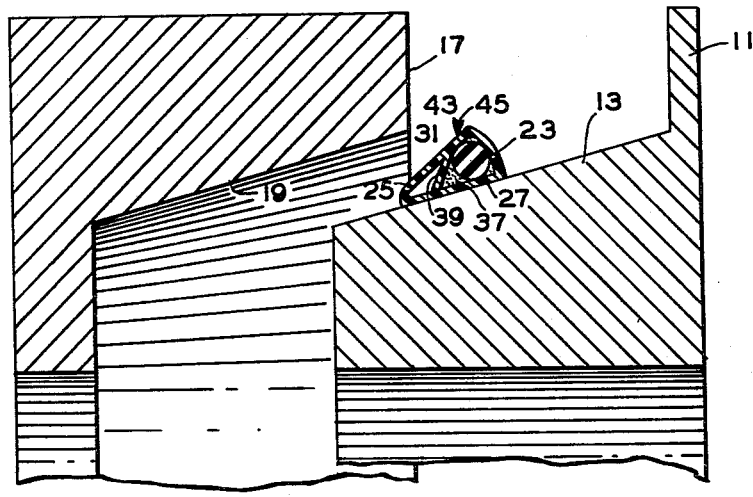
FIGURE 2 is a detail sectional view showing the bell and spigot of two pipes and a section of the gasket illustrating a slightly modified form of the present invention.

The pipe illustrated in FIGURE 2 is the same as the pipe illustrated in FIGURE 1 with the exception that the step 15 is omitted. The pipe with the spigot and bell described above is of conventional construction and forms no part of the present invention.

The reference numeral 21 designates a gasket composed of both rubber and plastic. The rubber ring 23 is preferably an O-ring. It is understood that the rubber ring may be made of molded rubber or other suitable resilient material and is not limited to any shape or form. The resilient plastic sheath or tube 25 is formed with a base member 27 having a stepped portion 29. An annular section 31 is connected to the base portion at 33 and 35 forming a circumlunar space 37. The web 39 is disposed between the annular section and base to support the annular section to prevent the annular section from collapsing. The plastic sheath or tube 25 is provided with a projection 41 which serves as a guide and positioning means for proper positioning of the gasket on the spigot.

A lubricant 43, preferably cornstarch, is disposed in the space 37 and surrounds the rubber ring so that the tensile stresses that may be placed upon the ring will be dissipated and will allow the ring to be positioned positively in proper alignment on the spigot.

The gasket 45 illustrated in FIGURE 2 is substantially the same as the gasket 21 with the exception that the guide portion 41 is omitted.

It is common practice in the art to cut the rubber gasket shorter than the circumference of the spigot so that the gasket will remain in a groove or in a predetermined position on a spigot. The stretch of the gasket may vary from 5% to 20% and is detrimental to the gasket in that it places stress thereon. The method of making the gasket of the present invention eliminates this disadvantage of the prior art devices. The rubber ring 23 is cut to substantially the circumferential diameter or length of the spigot or tongue, and the resilient plastic sheath 25 is cut at a length slightly smaller than the length of the rubber ring. The rubber ring is then lubricated, preferably with cornstarch, and inserted into the space 37 until one end of the rubber ring coincides with one end of the plastic sheath 25. The plastic is then elongated or stretched until the other end coincides with the other end of the rubber. The ends are then spliced together by cementing the ends of the rubber ring and vulcanizing the ends of the plastic sheath. Thus, it will be seen that when the gasket is placed on the spigot the plastic tube will be stretched and the rubber ring will be positively positioned thereon without development of tensile stresses in the rubber.

While only two selected example embodiments have been shown to illustrate the invention, it will be understood that this is not restrictive of the invention. It is reasonably expected that those skilled in the art can make numerous modifications of the invention, and it is intended that such modifications and revisions which incorporate the herein disclosed principles will be included within the scope of the following claims.

I claim as my invention:

1. A seal for a pipe joint comprising an annular hollow tubular sealing gasket adapted to engage around a spigot of a pipe and to be compressed between the wall portions of the spigot and bell forming a seal therebetween, said gasket having a base portion adapted to surround the spigot, an annular section connected to the base portion and extending outwardly from the base portion forming a hollow tubular portion, and a flexible ring slightly larger in diameter than the hollow tubular portion disposed within said hollow tubular portion to prevent the annular section from obtaining a permanent set when compressed between the wall portions of the spigot and bell.

2. A pipe joint sealing gasket adapted to engage around a spigot of a pipe and to be compressed between the wall portions of the spigot and bell forming a seal therebetween, said gasket having a base portion adapted to surround the spigot, an annular section connected to the base portion forming a hollow tubular portion, said base portion and section formed of a plasticized polyvinyl chloride, and a rubber ring having a circumference slightly larger than the tubular portion and disposed within said tubular portion to prevent the annular section from obtaining a permanent set when compressed between the wall portions of the spigot and bell.

3. A pipe joint sealing gasket adapted to engage around a spigot of a pipe and to be compressed between the wall portions of the spigot and bell forming a seal therebetween, said gasket having a plastic base portion adapted to surround the spigot, a plastic annular section connected to the inner and outer edges of the base portion and extending outwardly from the base portion forming a circumlunar hollow space therebetween, a web extending between the base portion and annular section to provide support for said annular section, and a flexible member slightly larger in diameter than the annular section, said flexible member disposed within the space between the web and annular section to prevent the annular section from obtaining a permanent set when compressed between the wall portions of the spigot and bell.

4. A pipe joint sealing gasket adapted to engage around a spigot of a pipe and to be compressed between the wall portion of the spigot and bell forming a seal therebetween, said gasket having a base portion adapted to surround the spigot, an annular section connected to the inner and outer edges of the base portion and extending outwardly from the base portion forming a circumlunar hollow space therebetween, a web disposed between the base portion and annular section to provide support for said annular section, said base portion, annular section and web formed of plastic material which is resistant to ozone and petroleum, and a rubber O-ring having a lubricant surrounding said ring disposed within one section of the circumlunar space to prevent the annular section from obtaining a permanent set when compressed between the wall portions of the spigot and bell.

5. A pipe joint sealing gasket adapted to engage around a spigot of a pipe and to be compressed between the wall portion of the spigot and bell forming a seal therebetween, said spigot having at least one stepped surface, the improvement comprising a plastic gasket having a base portion with one stepped annular surface adapted to surround a portion of the spigot, a first annular section connected to the base portion forming a first circumlunar hollow space therebetween, a second annular section connected to the base portion and first annular section forming a second circumlunar hollow space therebetween, and a rubber ring having a circumference slightly larger than the first circumlunar space and disposed within the first circumlunar space to prevent the annular section from obtaining a permanent set when compressed between the wall portions of the spigot and bell and a lubricant disposed in the first circumlunar space surrounding the rubber ring so that the rubber ring can rotate within the said first circumlunar space to be positioned in the proper circumferential alignment between the spigot and bell.

6. A pipe joint sealing gasket adapted to engage around a spigot of a pipe and to be compressed between the wall portion of the spigot and bell forming a seal therebetween, the improvement comprising a plastic gasket having a base portion adapted to surround the spigot, an annular section connected to the base portion forming a hollow tubular portion, a flexible member having a circumference slightly larger than the first circumlunar space and disposed within said tubular portion to prevent the annular section from obtaining a permanent set when compressed between the wall portions of the spigot and bell, and a lubricant disposed in the tubular member surrounding the flexible member so that the flexible member can rotate within said tubular member to be positioned in the proper circumferential alignment between the spigot and bell.

7. A method for making a gasket adapted to engage around a spigot of a pipe comprising the steps of: cutting a rubber strip to substantially the exact length of the circumference of the spigot, cutting a plastic tube to a length slightly smaller than the rubber strip, lubricating the rubber strip and inserting it into the plastic tube, stretching the plastic tube to substantially the same length as the rubber strip and splicing the ends of the rubber strip together and splicing the ends of the plastic tube together.

References Cited in the file of this patent

UNITED STATES PATENTS

| | | |
|---|---|---|
| 1,721,155 | Johnson | July 16, 1929 |
| 1,966,202 | Pfefferle | July 10, 1934 |
| 2,207,371 | Blackmore et al. | July 9, 1940 |
| 2,259,940 | Nathan | Oct. 21, 1941 |
| 2,597,976 | Cousins | May 27, 1952 |
| 2,717,025 | Jelinek | Sept. 6, 1955 |
| 2,822,191 | Risley | Feb. 4, 1958 |
| 2,882,073 | James | Apr. 14, 1959 |

UNITED STATES PATENT OFFICE
CERTIFICATE OF CORRECTION

Patent No. 3,058,752                        October 16, 1962

Chalmer Edward Miller

It is hereby certified that error appears in the above numbered patent requiring correction and that the said Letters Patent should read as corrected below.

Column 4, line 20, strike out "first circumlunar space" and insert instead -- tubular portion --.

Signed and sealed this 9th day of April 1963.

(SEAL)
Attest:

ESTON G. JOHNSON                        DAVID L. LADD
Attesting Officer                           Commissioner of Patents